(12) United States Patent (10) Patent No.: US 8,567,275 B2
Appelshaeuser et al. (45) Date of Patent: Oct. 29, 2013

(54) SYNCHRONIZING DEVICE OF A TRANSMISSION

(75) Inventors: Joerg Appelshaeuser, Mainz (DE); Viktor Werwein, Bensheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 134 days.

(21) Appl. No.: 13/223,510

(22) Filed: Sep. 1, 2011

(65) Prior Publication Data

US 2012/0060632 A1 Mar. 15, 2012

(30) Foreign Application Priority Data

Sep. 10, 2010 (DE) .......................... 10 2010 044 957

(51) Int. Cl.
*F16D 23/02* (2006.01)

(52) U.S. Cl.
USPC .......................................... 74/339; 192/53.36

(58) Field of Classification Search
USPC ..................... 74/339; 192/53.34, 53.35, 53.36
See application file for complete search history.

(56) References Cited

U.S. PATENT DOCUMENTS

| | | | | |
|---|---|---|---|---|
| 2,470,208 A | * | 5/1949 | Avila | 192/53.36 |
| 2,992,714 A | * | 7/1961 | Peras | 192/53.36 |
| 3,035,674 A | * | 5/1962 | Peras | 192/53.35 |
| 4,776,228 A | * | 10/1988 | Razzacki et al. | 74/339 |
| 4,809,832 A | | 3/1989 | Inui | |
| 5,620,075 A | * | 4/1997 | Larsen et al. | 192/53.34 |
| 6,588,563 B1 | | 7/2003 | Sarrach et al. | |

FOREIGN PATENT DOCUMENTS

| | | |
|---|---|---|
| DE | 3225364 A1 | 1/1984 |
| DE | 19853896 A | 5/2000 |
| DE | 10028472 A1 | 12/2001 |
| DE | 10036087 B4 | 10/2009 |
| EP | 1310693 A1 | 5/2003 |

OTHER PUBLICATIONS

German Patent Office, German Search Report for Application No. 102010044957.1, dated Dec. 8, 2011.

\* cited by examiner

*Primary Examiner* — Ha D Ho
(74) *Attorney, Agent, or Firm* — Ingrassia Fisher & Lorenz, P.C.

(57) ABSTRACT

A synchronizing device of a transmission is provided with a cylindrical synchronizer body having an external toothing. A shifting sleeve includes, but is not limited to an internal toothing. The internal toothing axially displaceably meshes with the external tooting of the synchronizer body. A synchronizing ring includes, but is not limited to a locking gear rim. In clearances distributed on the circumference of the synchronizer body, pre-synchronizing elements are arranged. The pre-synchronizing elements are in spring-elastic engagement with the shifting sleeve and are arrested by the shifting sleeve in a middle position. A face end of the locking gear rim includes, but is not limited to outward bulges in direction of the pre-synchronizing elements subject to the setting of spacing between synchronizing ring and pre-synchronizing elements.

17 Claims, 4 Drawing Sheets

SYNCHRONIZING DEVICE OF A TRANSMISSION

CROSS-REFERENCE TO RELATED APPLICATION

This application claims priority to German Patent Application No. 102010044957.1, filed Sep. 10, 2010, which is incorporated herein by reference in its entirety.

TECHNICAL FIELD

The technical field relates to a synchronizing device of a transmission with a cylindrical synchronizer body having an external toothing. A shifting sleeve comprises an internal toothing, wherein the internal toothing meshes with the exterior toothing of the synchronizer body in an axially shiftable manner. At least one synchronizing ring comprises a locking gear rim.

BACKGROUND

U.S. Pat. No. 4,809,832 discloses a synchronizing device in which the axial position of the synchronizing rings relative to the shifting sleeve is achieved by means of preloaded leaf spring elements, which support themselves on the hub of a toothed gearwheel and hold the synchronizing ring spaced from a middle position of the shifting sleeve. As has transpired, this spacing has to be accurately maintained in order to avoid slipping of the shifting sleeve on the synchronizing ring. Since the width of the shifting sleeve various in axial direction—dependent on the torque to be transmitted during the shifting operation—the axial width of the toothed gearwheel also differs and requires differently preloaded leaf spring elements.

At least one object is to create a synchronizing device of a transmission having a reduced number of differently dimensioned components. In addition, other objects, desirable features and characteristics will become apparent from the subsequent summary and detailed description, and the appended claims, taken in conjunction with the accompanying drawings and this background.

SUMMARY

In a first embodiment a synchronizing device of a transmission with a cylindrical synchronizer body having an exterior toothing is created. A shifting sleeve comprises an internal toothing. The internal toothing meshes with the external toothing of the synchronizer body in an axially shiftable manner. At least one synchronizing ring comprises a locking gear rim. On the circumference of the synchronizer body pre-synchronizing elements are arranged distributed in clearances. The pre-synchronizing elements are spring-elastically in engagement with the shifting sleeve and are arrested by the shifting sleeve in a center position. A face end of the locking gear rim comprises outward bulges in the direction of the pre-synchronizing elements subject to the setting of spacing between synchronizing ring and pre-synchronizing elements.

This synchronizing device has the advantage that the number of the different pre-synchronizing elements to be kept in stock in a production can be clearly reduced, since the setting of the spacing between synchronizing ring and pre-synchronizing element can be affected through outward bulges subsequently introduced into the locking gear rim. Consequently, preformed and pre-stamped synchronizing rings of plate can be uniformly produced and also the pre-synchronizing elements can be pre-fabricated in large number with identical dimensions. The locking gear rims will then have to be provided with outward bulges merely before the assembly of a synchronizing device. To this end, the outward bulges can have a wide range of shapes since the important aspect here is merely the axial extension of the outward bulges.

Thus, such an outward bulge can be preferentially embodied oval, cylindrical or semi-spherical. The outward bulges to this end are stamped into the face ends of the locking rim located opposite the pre-synchronizing elements, i.e. the outward bulges to be introduced in axial direction are stamped in with the help of a stamping tool, so that in each case the spacing between pre-synchronizing element and synchronizing ring is maintained without a plurality of pre-synchronizing elements of different widths having to be kept in stock.

Instead of a stamping-in it is also possible to achieve the setting of the spacing in that the outward bulges are formed through the application of weld pumps or brazing solder pads. This is advantageous with a correction of the spacing in the sub-millimeter and millimeter range.

In further embodiments it is also possible to apply preformed moldings as outward bulges onto the face end of the locking gear rims. These moldings can be materially connected to the face end of the locking gear rim through welding, soldering or brazing or even by means of high temperature-resistant adhesives. With the help of such moldings spacing corrections of any size can be carried out. For setting the spacing it is ensured that the extension of the outward bulges in axial direction is adapted to different axial widths of the shifting sleeve with axial width of the pre-synchronizing elements remaining the same.

The axial width of the shifting sleeve in this case is adapted to the axial width of an inner cone of the synchronizing ring transmitting torque and to the axial width of the clutch gear rims of the toothed gearwheels transmitting the torque. Thus, the axial setting of the pre-synchronizing spacing between pre-synchronizing element and shifting sleeve is improved in an advantageous manner. Furthermore, the number of different parts, particularly with respect to the pre-synchronizing elements, is reduced and finally the production costs and the investments, for example for stock keeping can thus be reduced.

A further embodiment relates to a transmission that is equipped with such a synchronizing device. Here, the transmission comprises at least one synchronizing device. The transmission comprises toothed gearwheels which are rotatable mounted on a transmission shaft and comprise clutch gear rims. The clutch gear rims can be coupled to an internal toothing of a shifting sleeve of the synchronizing device. A cylindrical synchronizer body is fixed on the transmission shaft in a rotationally fixed and axially fixed manner and comprises an external toothing. The shifting sleeve meshes with its internal toothing in an axially shiftable manner on the external toothing of the synchronizer body. On the circumference, pre-synchronizing elements distributed in clearances of the synchronizer body are arranged, which are spring-elastically in engagement with the shifting sleeve. The pre-synchronizing elements are arrested by the shifting sleeve in a middle position. A face end of a locking gear rim of a synchronizing ring comprises outward bulges in the direction of the pre-synchronizing elements subject to the setting of the spacing between the synchronizing ring and the pre-synchronizing elements. Because of the above advantages of the synchronizing device, such a transmission can be produced more economically, more so since dependent on a number of the gears to be shifted and to be synchronized a plurality of such synchronizing devices is required in a change-speed transmission.

The outward bulges can be cylindrical, semi-spherical or oval and can be stamped into the face end of the locking gear rim located opposite the pre-synchronizing elements. The stamping method is economical and can set the outward bulges accurately delimited. The outward bulges can also have applied weld pumps or brazing solder pads, more so if only minor settings in the sub-millimeter or millimeter magnitude of the spacing between synchronizing ring and pre-synchronizing elements become necessary. For larger settings of the spacing between synchronizing ring and pre-synchronizing elements moldings preformed as outward bulges can also be applied, wherein the moldings can be materially connected to the face end of the locking gear rim through welding, brazing or gluing.

A vehicle is provided having at least one of the synchronizing devices described above in a transmission is provided in accordance with an embodiment.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
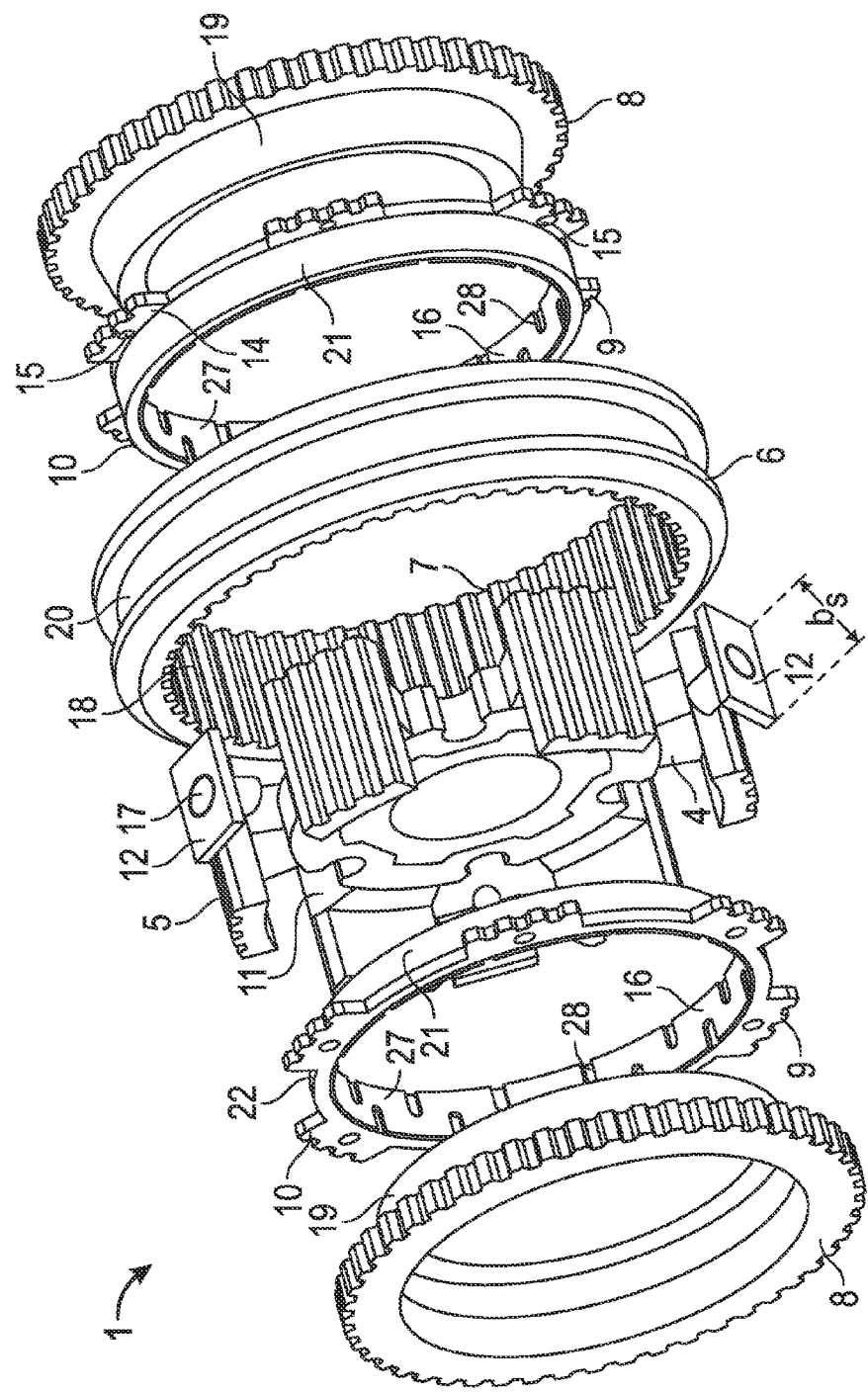
FIG. 1 shows an expanded, perspective view of a synchronizing device according to an embodiment.

FIG. 1 shows an expanded, perspective view of a synchronizing device 1, which in its middle region comprises a synchronizer body 4 with an external toothing 5 and clearances 11. In the clearances 11 pre-synchronizing elements 12 are arranged. These pre-synchronizing elements 12 comprise a spring-elastically preloaded arresting ball 17. The pre-synchronizing elements 12 have a width $b_s$ in axial direction.

The synchronizer body 4 carries a shifting sleeve 6 with an internal toothing 7, wherein the internal toothing 7 comprises clearances 18, in which the spring pre-loaded arresting balls 17 of the pre-synchronizing elements 12 can engage. Apart from this, the internal toothing 7 is in engagement with the external toothing 5 of the synchronizer body 4. The synchronizer body 4 itself additionally comprises an internal toothing 29, which is in engagement with a transmission shaft which is not shown here, so that the synchronizer body 4 is fixed on the transmission shaft in a rotationally fixed manner and is rotated with said transmission shaft.

In addition to the components which via their external toothing 5 and their internal toothing 7 are in engagement with one another, synchronizing rings 9 are arranged on both sides of the shifting sleeve 6, which with an inner cone 16 are in frictionally connected engagement with an outer cone 19 of clutch gear rims 8 of toothed gearwheels which are not shown here.

Figure 2:
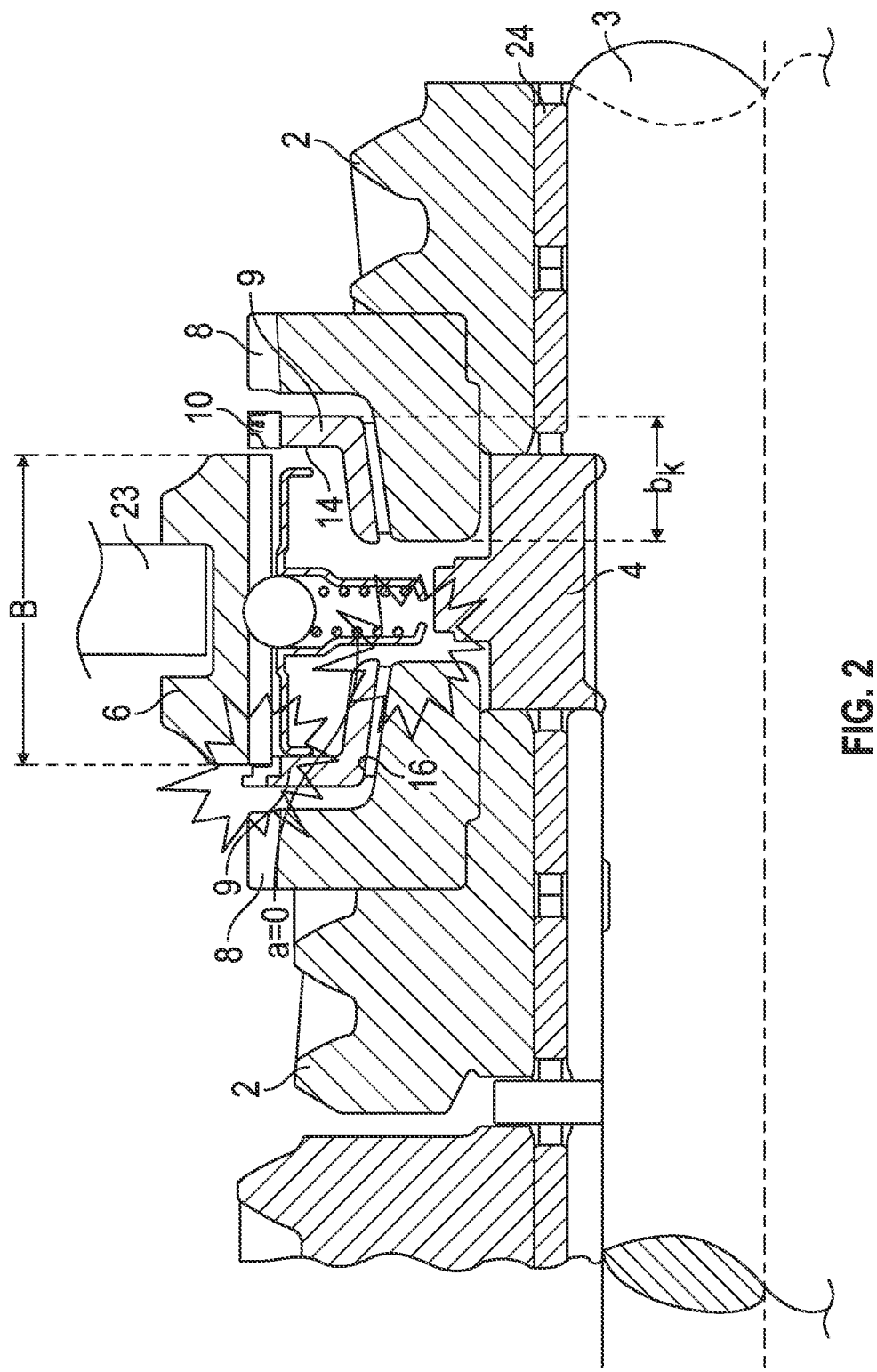
FIG. 2 shows a schematic sketch with cross section through a synchronizing device.

The synchronizing ring 9 via a frictional connection between its inner cone 16 and the outer cone 19 of the clutch gear rim 8 of a toothed gearwheel 2 shown in FIG. 2 accelerates the toothed gearwheel 2 to the rotational speed of the synchronizer body 4, which rotates with the transmission shaft, as soon as a shifting fork which engages in a ring groove 20 of the shifting sleeve 6 and axially displaces the shifting sleeve 6 in the direction of the synchronizing ring 9. The synchronizing ring 9 apart from the inner cone 16 and an outer cone 21 comprises a locking gear rim 10, which in portions is arranged on the circumference of the synchronizing ring 9. In addition, face ends 14 of the locking toothing of the locking gear rim 10 comprise outward bulges 15, with which a defined spacing to the pre-synchronizing elements 12 can be adjusted. The setting is affected through a subsequent introduction of stampings or through a subsequent application of the outward bulges 15 onto the face ends 14 of the locking gear rims 10 of the synchronizing rings 9.

FIG. 2 shows a diagrammatic sketch as cross section through a synchronizing device with inadequate spacing between synchronizing ring 9 and shifting sleeve 6 as well as between synchronizing ring 9 and pre-synchronizing element 12, although a shifting fork 23 has a middle position 13. Such a situation can only be prevented in that with neutral middle position of the shifting sleeve 6 a minimum spacing to the pre-synchronizing element 12 is maintained, which is achieved through the outward bulges 15 on the face ends 14 of the locking gear rims 10 of the synchronizing rings 9 shown in FIG. 1.

The clutch gear rims 8 of the respective toothed gearwheels 2 shown in FIG. 2 are shrunk or welded onto these toothed gearwheels 2, for example by means of laser welding, or are already forged into the toothed gearwheel 2 and with the toothed gearwheels 2 are mounted on the transmission shaft 3 via needle bearings 24, while the synchronizer body 4 is connected to the transmission shaft 3 in a rotationally fixed manner via the internal toothings 29 shown in FIG. 1. Only when the locking toothing 10 of the synchronizing ring 9 has reached synchronization with the clutch gear rim 8 can the shifting sleeve be shifted over the locking toothing of the locking gear rim 10 onto the clutch gear rim 8 so that now a torque of the transmission shaft 3 can now be transmitted onto the toothed gearwheel 2 via the synchronizer body 4, the shifting sleeve 6 and the clutch gear rim 8.

Figure 3:
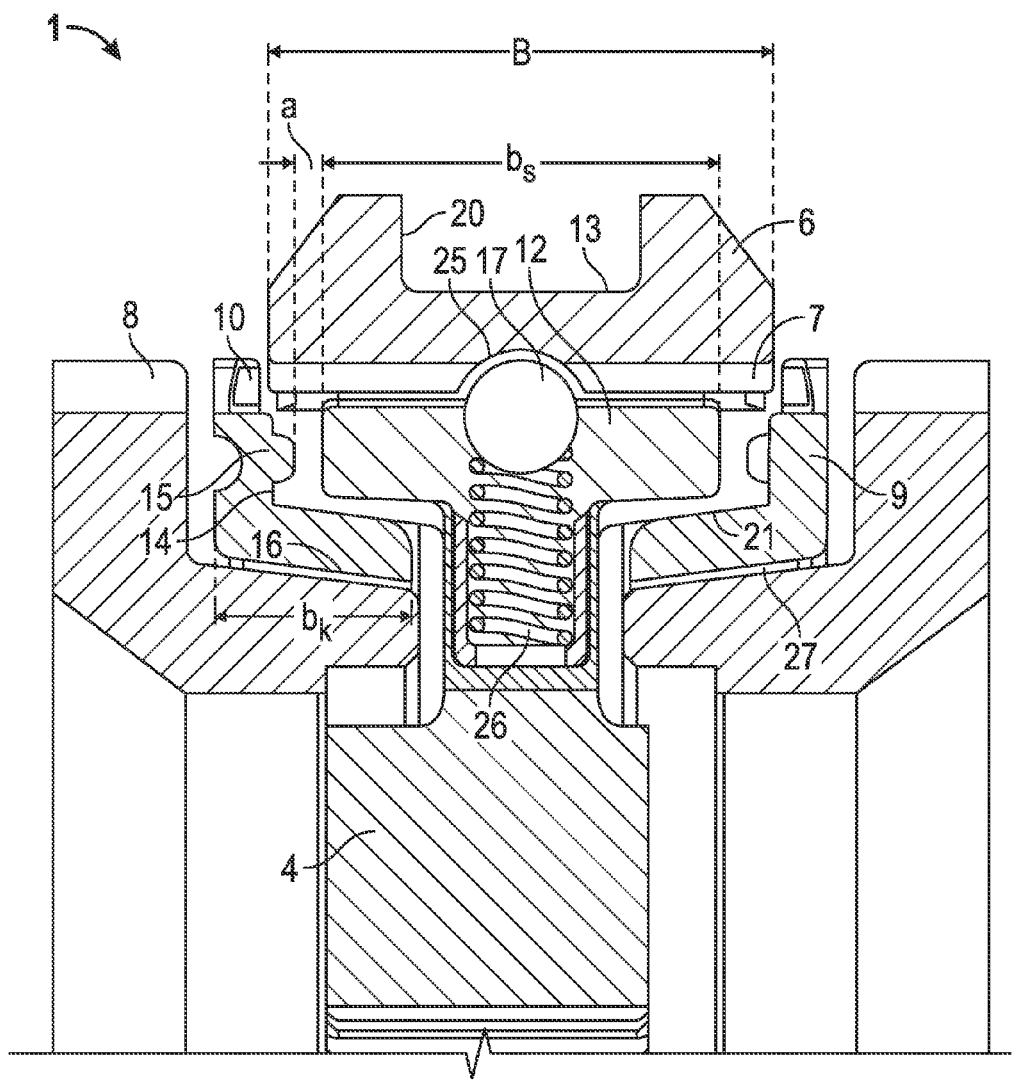
FIG. 3 shows a schematic cross section through a synchronizing device according to FIG. 1.

FIG. 3 shows a schematic cross section through a synchronizing device 1. In this cross section the pre-synchronizing element 12 and the shifting sleeve 6 are arranged in a middle position 13. Through the outward bulges 15 on the face ends 14 of the locking gear rims 10 of the synchronizing rings 9 a spacing a between the pre-synchronizing element 12 and the synchronizing ring 9 is set.

The width B of the shifting sleeve 6 in axial direction varies because of the different axial width $b_K$ of the inner cone 16 of the synchronizing ring 9. The width $b_K$ of the inner cone 16 of the synchronizing ring 9 depends on the torque to be transmitted from the transmission shaft 3 shown in FIG. 2 onto the clutch gear rim 8 of toothed gearwheels which are not shown here via the synchronizer body 4 and the transmission shaft 3. The greater the torque, the greater the axial width $b_K$ of inner cone 16 has to be selected and thus also the axial width B of the shifting sleeve 6, so that in principle the pre-synchronizing elements 12 would have to have different axial widths $b_s$. However, with this embodiment of the application this is offset through the outward bulge 15 so that the spacing a between synchronizing ring 9 and pre-synchronizing element 12 can be maintained. Thus it is possible for example with a double clutch transmission that for the synchronizing device 1 between a first and third gear and the synchronizing device 1 between a second and fourth gear pre-synchronizing elements 12 of the same size are used. In the middle position 13 of the shifting sleeve 6 shown here the arresting ball 17 protrudes into a corresponding clearance 25 of the internal toothing 7 of the shifting sleeve 6, wherein a helical spring 26 supplies the required spring preload.

Figure 4:
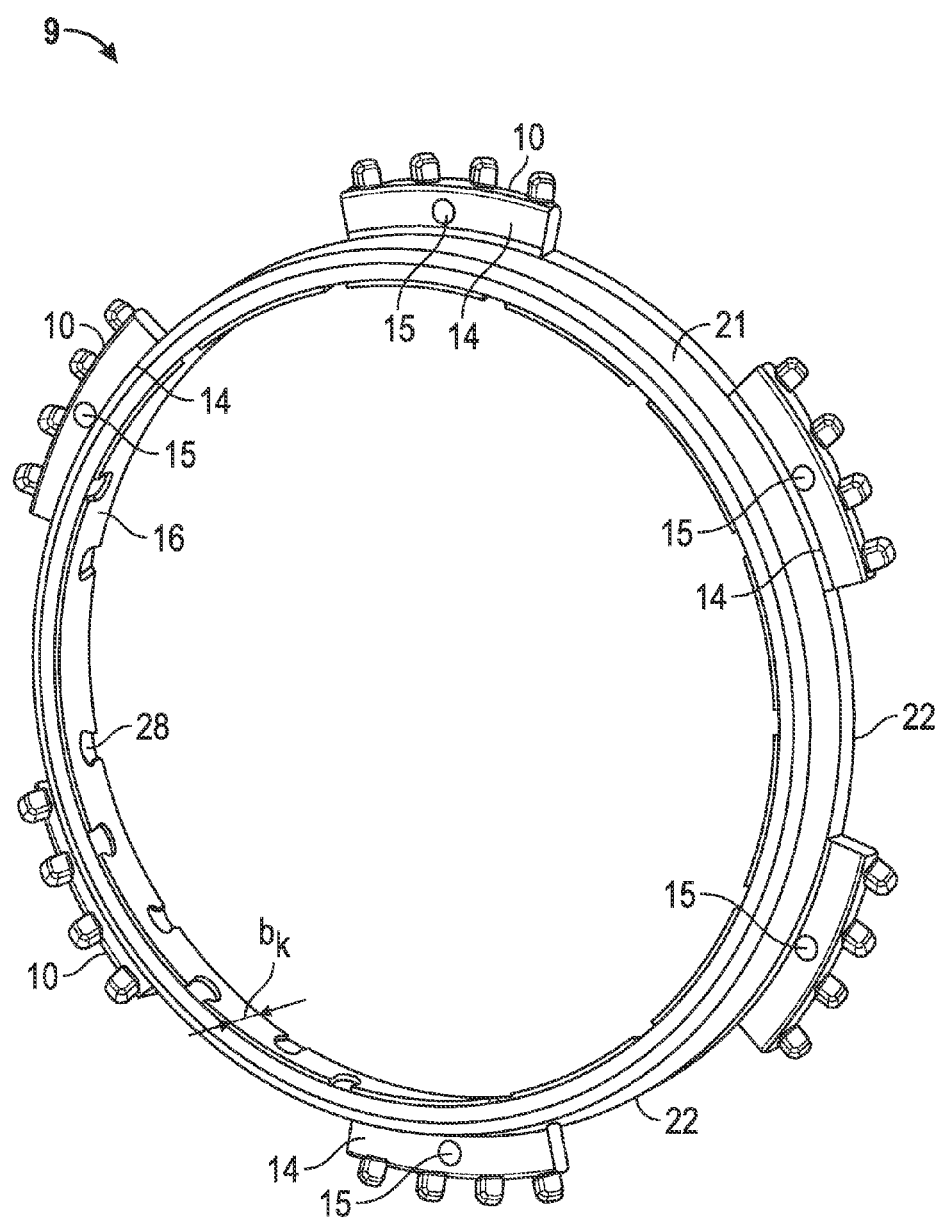
FIG. 4 shows a schematic perspective view of a synchronizing ring according to the embodiment in FIG. 1.

FIG. 4 shows a schematic perspective view of a synchronizing ring 9 with an inner cone 16 and an outer cone 21. The inner cone 16 has a friction lining 27, in which oil scraper grooves 28 are arranged. In addition, the synchronizing ring 9 has a locking gear rim 10 which distributed on the circumference comprises six clearances 22, while on the face ends 14 of the locking gear rim 10 the outward bulges provided for a spacing between the pre-synchronizing elements 12 and the synchronizing ring 9 shown in FIG. 1 are arranged. As mentioned above, these outward bulges 15 can be stamped in or applied to the face ends 14 of the locking gear rim 10 by means of laser application, welding application or by another method.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A synchronizing device of a transmission, comprising:
   a cylindrical synchronizer body having an external toothing;
   a shifting sleeve comprising an internal toothing that axially displaceably meshes with the external toothing of the cylindrical synchronizer body;
   a synchronizing ring having a locking gear rim;
   pre-synchronizing elements distributed on a circumference in clearances of the cylindrical synchronizer body, the pre-synchronizing elements in spring-elastic engagement with the shifting sleeve and arrested by the shifting sleeve in a middle position; and
   a face end of the locking gear rim comprising outward bulges in a direction of the pre-synchronizing elements that is subject to a setting of spacing between the synchronizing ring and the pre-synchronizing elements.

2. The synchronizing device according to claim 1, wherein the outward bulges are cylindrical.

3. The synchronizing device according to claim 1, wherein the outward bulges are stamped into the face end of the locking gear rim located opposite the pre-synchronizing elements.

4. The synchronizing device according to claim 1, wherein the outward bulges are applied welded humps.

5. The synchronizing device according to claim 1, wherein the outward bulges are preformed applied moldings.

6. The synchronizing device according to claim 5, wherein the preformed applied moldings are materially connected to the face end of the locking gear rim.

7. The synchronizing device according to claim 1, wherein an axial width of the shifting sleeve is adapted to the axial width of a torque transmitting inner cone of the synchronizing ring and to the axial width of a torque transmitting clutch gear rim of a toothed gearwheel.

8. The synchronizing device according to claim 1, wherein an extension of the outward bulges in an axial direction is adapted to different axial widths of the shifting sleeve for different toothed gearwheels with axial widths of the pre-synchronizing elements remaining the same.

9. A transmission, comprising:
   a synchronizing device, comprising:
      a cylindrical synchronizer body having an external toothing;
      a shifting sleeve comprising an internal toothing that axially displaceably meshes with the external toothing of the cylindrical synchronizer body;
      a synchronizing ring having a locking gear rim;
      pre-synchronizing elements distributed on a circumference in clearances of the cylindrical synchronizer body, the pre-synchronizing elements in spring-elastic engagement with the shifting sleeve and arrested by the shifting sleeve in a middle position; and
      a face end of the locking gear rim comprising outward bulges in a direction of the pre-synchronizing elements that is subject to a setting of a spacing between the synchronizing ring and the pre-synchronizing elements; and
   toothed gearwheels that are rotatably mounted on a transmission shaft and comprise clutch gear rims coupled to an internal toothing of the shifting sleeve of the synchronizing device.

10. The transmission according to claim 9, wherein the outward bulges are oval.

11. The transmission according to claim 9, wherein the outward bulges are cylindrical.

12. The transmission according to claim 9, wherein the outward bulges are semi-spherical.

13. The transmission according to claim 9, wherein the outward bulges are stamped into the face end of the locking gear rim located opposite the pre-synchronizing elements.

14. The transmission according to claim 9, wherein the outward bulges are applied welding humps.

15. The transmission according to claim 9, wherein the outward bulges are brazing solder pads.

16. The transmission according to claim 9, wherein the outward bulges are preformed applied moldings.

17. The transmission according to claim 16, wherein the preformed applied moldings are materially connected to the face end of the locking gear rim.

* * * * *